(12) United States Patent
Takegami

(10) Patent No.: US 6,671,190 B2
(45) Date of Patent: Dec. 30, 2003

(54) DC/DC CONVERTER

(75) Inventor: Eiji Takegami, Nagaoka (JP)

(73) Assignee: Densei-Lambda Kabushiki Kaisha (JP)

(*) Notice: Subject to any disclaimer, the term of this patent is extended or adjusted under 35 U.S.C. 154(b) by 0 days.

(21) Appl. No.: 10/097,790

(22) Filed: Mar. 13, 2002

(65) Prior Publication Data

US 2002/0131277 A1 Sep. 19, 2002

(30) Foreign Application Priority Data

Mar. 13, 2001 (JP) .......................... 2001-070127

(51) Int. Cl.[7] .............................................. H02M 3/335
(52) U.S. Cl. ...................................... 363/21.18; 363/20
(58) Field of Search ........................... 363/21.18, 21.06, 363/21.12, 89, 90, 91, 82, 124, 130, 95, 97, 131

(56) References Cited

U.S. PATENT DOCUMENTS 5,963,438 A * 10/1999 Chen .......................... 363/20
6,490,178 B1 * 12/2002 Asayama ................. 363/21.06

FOREIGN PATENT DOCUMENTS

| JP | 11-235035 A | 8/1999 |
| JP | 11-299237 A | 10/1999 |
| JP | 2000-341943 A | 12/2000 |

* cited by examiner

Primary Examiner—Rajnikant B. Patel
(74) Attorney, Agent, or Firm—Akerman Senterfitt

(57) ABSTRACT

A series circuit of a primary winding 1A of a transformer 1 and a switching element 2 is coupled to a DC source 3 and a voltage induced in a secondary winding 1B of the transformer 1 according to switching operation of the switching element 2 is rectified and smoothed by a rectifier smoothing circuit 9. Further, a Zener diode 21 is coupled across the switching element 2 with reverse polarity to the switching element 2. The Zener diode 21 may be coupled across a rectifier diode 5 which conducts during the ON period of the switching element 2.

4 Claims, 5 Drawing Sheets

DC/DC CONVERTER

BACKGROUND OF INVENTION

1. Field of the Invention

The present invention relates to a DC/DC converter which limits a flyback voltage (reset voltage) generated in a primary winding of a transformer when a switching element turns off.

2. Description of the Related Art

FIG. 4 shows a circuit of an isolation type DC/DC converter of a general forward topology. In the figure, numeral 1 denotes a transformer whose primary and secondary sides are isolated from each other, numeral 2 denotes a switching element comprising, for example, MOSFET, and a series circuit of a primary winding 1A of the transformer 1 and the switching element 2 is coupled across a DC source 3 supplying DC input voltage Vi. A rectifier smoothing circuit 9 comprising a rectifier diode 5, a free-wheeling diode 6, a choke coil 7 and a smoothing capacitor 8 is coupled to a secondary winding 1B of the transformer 1. A voltage induced in the secondary winding 1B of the transformer 1 according to the switching operation of the switching element 2 is rectified and smoothed so that a DC output voltage Vo is developed at output terminals 10 and 11 coupled across the smoothing capacitor 8. In the circuit of the example, when the switching element 2 turns on, a positive voltage is induced at a dotted side terminal of the secondary winding 1B of the transformer 1 so that the rectifier diode 5 turns on and the free-wheeling diode 6 turns off. As a result, energy is fed through the rectifier diode 5 to the choke coil 7, and then to a load (not shown) between the output terminals 10 and 11. On the other hand, when the switching element 2 turns off, a positive voltage is, in turn, induced at a non-dotted side terminal of the secondary winding 1B so that the rectifier diode 5 turns off and the free-wheeling diode 6 turns on. Accordingly, in this case, energy which has been already stored in the choke coil 7 is fed to the load coupled between the terminals 10 and 11.

Numeral 12 denotes an amplifier circuit for monitoring output voltage, which monitors the DC output voltage Vo and feeds an amplified differential signal according to a difference from a reference voltage to a PWM (Pulse Width Modulation) controlling circuit 13. A pulse conduction width of a drive signal fed to a gate of the switching element 2 in response to the variation of the DC output voltage Vo can be varied for stabilizing the DC output voltage Vo.

FIG. 5 shows a voltage Vds across a drain and a source of the switching element 2 in FIG. 4, and a voltage Vr at a cathode whose reference point is set on an anode of the rectifier diode 5 in FIG. 4. In the figure, during the ON period (Ton) of the switching element 2, the DC input voltage Vi is applied across the primary winding 1A of the transformer 1 so that a voltage across the switching element 2, that is, the voltage Vds across the drain and the source becomes zero and due to a voltage induced at the dotted side terminal of the secondary winding 1B of the transformer 1, the voltage Vr across the rectifier diode 5 also becomes zero. (In this case, a forward voltage drop of the rectifier diode 5 is assumed to be negligible.)

On the other hand, during the OFF period (Toff) of the switching element 2, the reset voltage is developed across the primary winding 1A by an inertial current flowing through the primary winding 1A of the transformer 1 so that the voltage Vds across the drain and the source of the switching element 2 becomes one where the DC input voltage Vi from the DC source 3 and the reset voltage of the primary winding 1A are superimposed (S1 region in FIG. 5). At this time, since a voltage proportional to a turn ratio of the secondary winding 1B to the primary winding 1A is induced at the dotted side terminal in the secondary winding 1B of the transformer 1, the rectifier diode 5 turns off while the free-wheeling diode 6 turns on so that the voltage generated in the secondary winding 1B is directly applied to both terminals of the rectifier diode 5 (in this case, provided that the forward voltage drop of the rectifier diode 5 is assumed to be negligible).

When a core of the transformer 1 is reset soon, the reset voltage ceases to be generated in the primary winding 1A so that voltage Vds across the drain and the source of the switching element 2 becomes equal to the DC input voltage Vi, while the voltage Vr across the rectifier diode 5 becomes zero.

Thus, the ON-OFF operation of the switching element 2 causes magnetic flux passing through the core of the transformer 1 to repeat increase (set) and decrease (reset) alternately. However, in order to prevent the transformer 1 from being saturated due to incomplete reset, the DC input voltage Vi and a variable range of duty of the switching element 2 or the like are so determined that a product S1 of the voltage and the time during the OFF period of the switching element 2 is equal to a product S2 of those during the ON period of the switching element 2. However, if the ON period of the switching element 2 is prolonged by an abrupt change in an output power or the like, as such relation that S1 is equal to S2 is kept as aforementioned, the reset voltage of the transformer 1 during the OFF period of the switching element 2 increases due to the abovementioned prolongation of time, so that as shown by chain lines in FIG. 5, peak values of the voltage Vds across the drain and the source of the switching element 2 and those of the voltage across the rectifier diode 5 are increased. Therefore, such an element with an inferior property and a high withstand voltage that can withstand even during such increase in the reset voltage, had to be employed as the switching element 2 or the rectifier diode 5.

SUMMRY OF THE INVENTION

Accordingly, in view of the abovementioned problems, the present invention aims at providing a DC/DC converter that can control effectively increase in a reset voltage of a transformer during the OFF period of a switching element by using a simple circuitry.

The DC/DC converter of the present invention including a series circuit, of a primary winding of the transformer and the switching element, which is coupled to a DC source and a rectifier smoothing circuit which rectifies and smoothes a voltage induced by the switching operation of the switching element in a secondary winding of the transformer, wherein a Zener diode is coupled in parallel with the switching element with reverse polarity to the switching element.

Thus, during the OFF period of the switching element, a voltage, which is the sum of an input voltage of the DC source and the reset voltage generated in the primary winding of the transformer, is applied across the switching element. However, when the voltage across the switching element reaches an operating voltage of the Zener diode, the Zener diode conducts so that the reset voltage ceases increasing further. As a result, even if the ON period of the switching element is prolonged due to an abrupt change in an output power or the like, voltages both across the switching element and across the rectifier diode during the OFF period of the switching element are inevitably clamped whenever the Zener diode begins to conduct. Accordingly, notwithstanding such a simple circuitry that only the Zener diode is added to a conventional circuitry, it becomes possible that during the OFF period of the switching element, an increase in the reset voltage of the transformer can be effectively ceased so that an element with a superior property and a low withstand voltage can be employed as the switching element.

BRIEF DESCRIPTION OF THE DRAWING

For a more complete understanding of the present invention, reference is now made to the following description taken in conjunction with appended drawings, in which.

DESCRIPTION OF THE PREFERED EMBODIMENT

Figure 4:
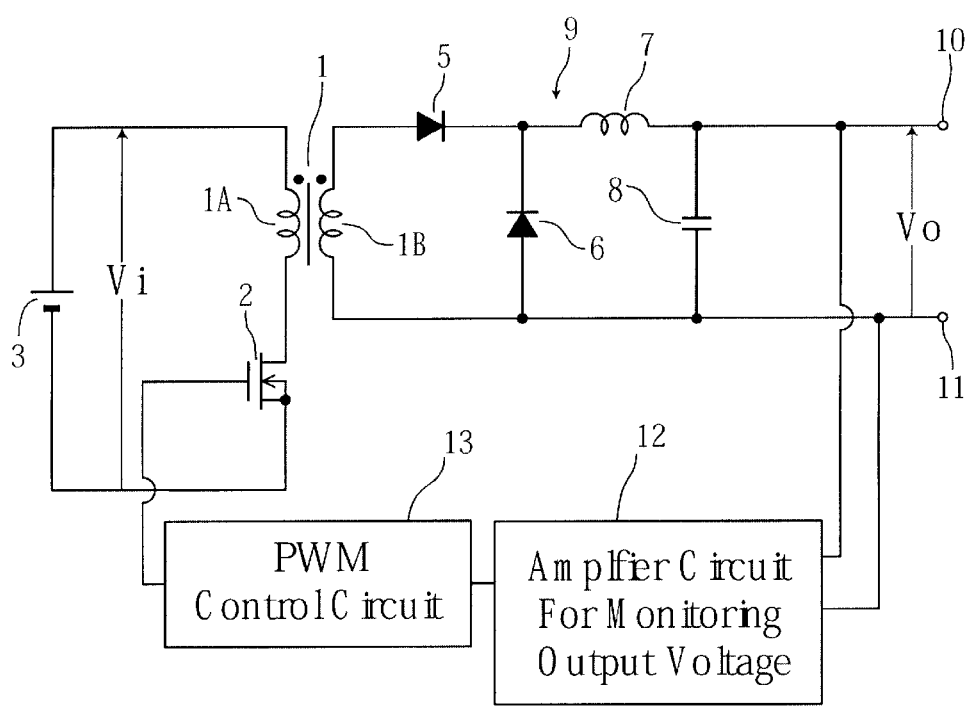
FIG. 4 is a circuit diagram of a DC/DC converter illustrating a prior art.
Figure 5:
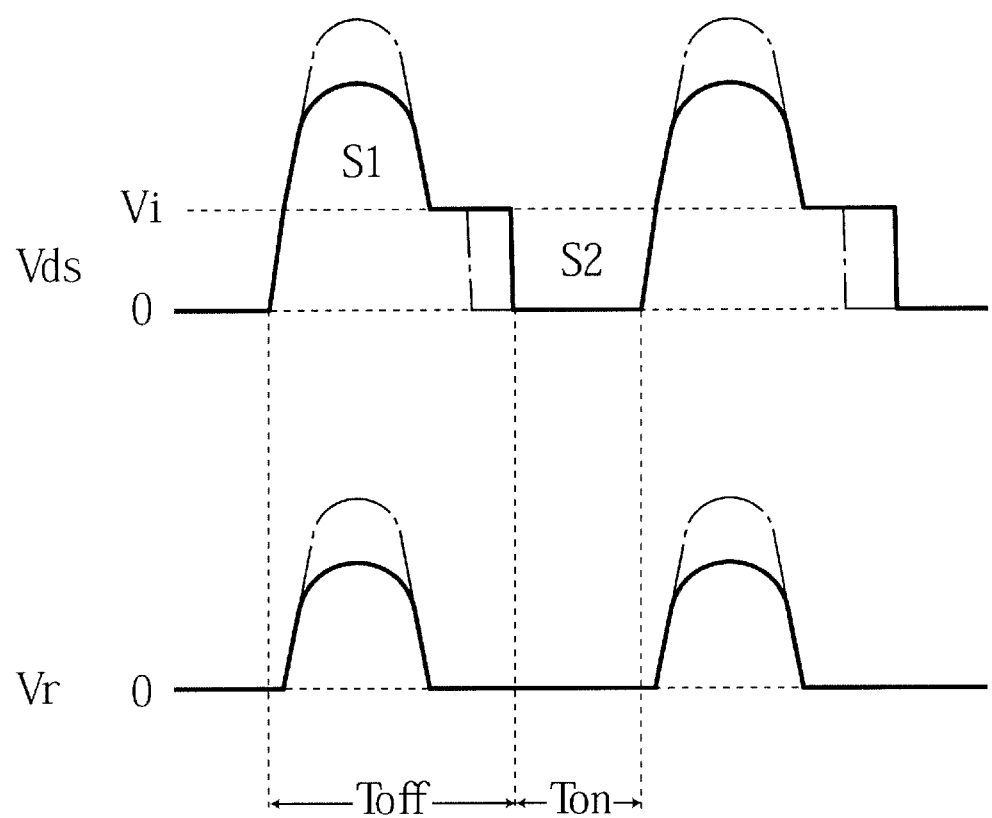
FIG. 5 is a waveform diagram showing a voltage across a drain and a source of a switching element and a voltage across a rectifier diode in a prior art of FIG. 4.

Hereunder is a description of preferred embodiments of the present invention with reference to the appended drawings. In these embodiments, the same numerals are used for the parts the same as those in FIG. 4 showing the aforementioned prior art and repeated detailed description thereof is omitted.

Figure 1:
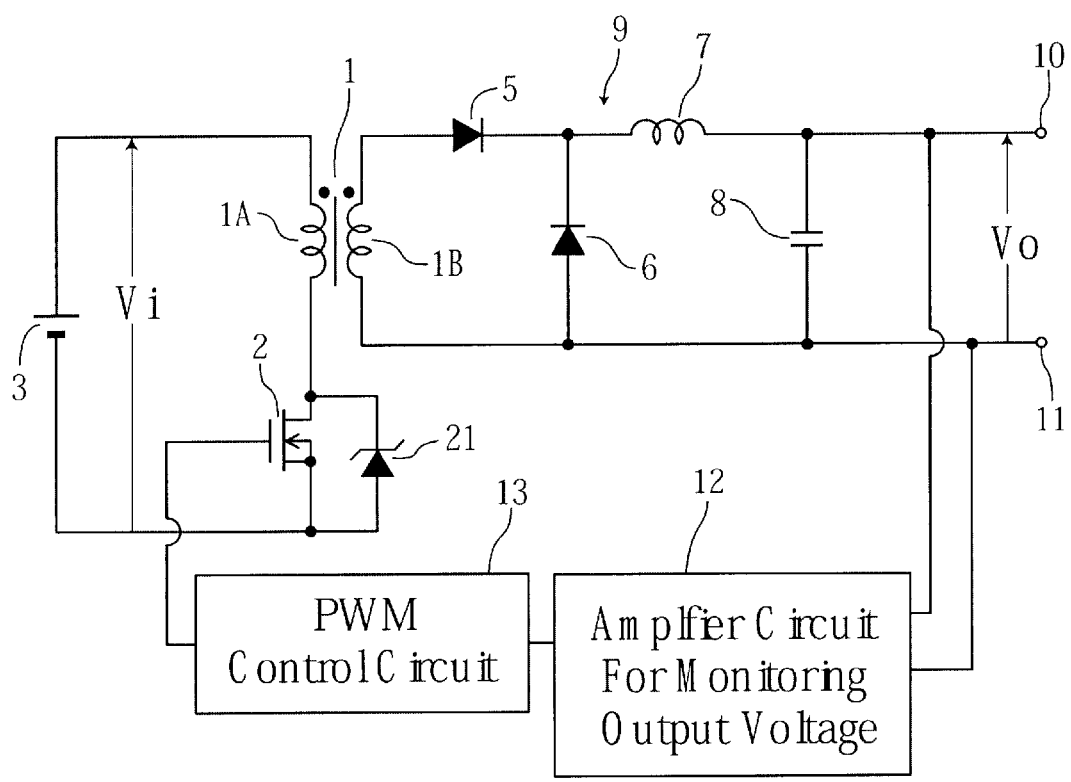
FIG. 1 is a circuit diagram of a DC/DC converter illustrating a first embodiment of the present invention

FIG. 1 shows a circuit of a preferred DC/DC converter showing a first embodiment of the present invention. In the figure, numeral 21 denotes a Zener diode with constant voltage characteristics, coupled across the switching element 2, that is, across the drain and the source of the switching element 2 with reverse polarity to the switching element 2. Here, a operating voltage Vz (Zener voltage) of the Zener diode 21 is selected to be a lower voltage than a withstand voltage between the drain and the source of the switching element 2, while an anode of the Zener diode 21 is coupled to the source of the switching element 2 and a cathode of the Zener diode 21 to the drain of the switching element 2. Other topology of the circuitry is the same as the prior art shown in FIG. 4.

Figure 2:
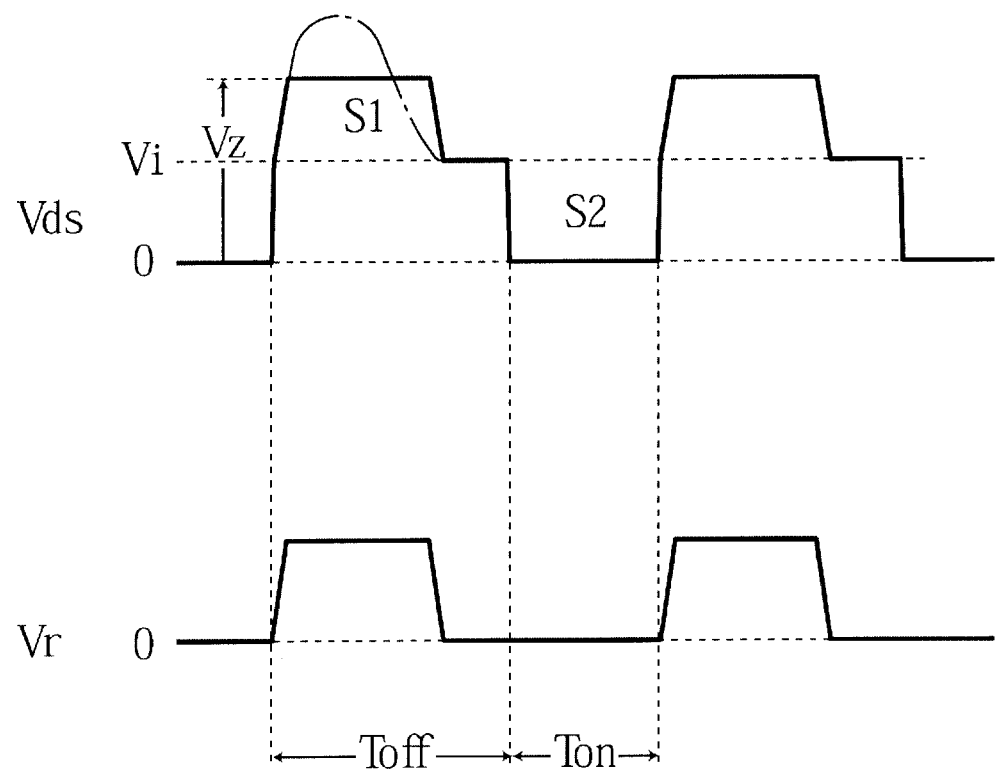
FIG. 2 is a waveform diagram showing a voltage across a drain and a source of a switching element and a voltage across a rectifier diode, in FIG. 1.

Next is a description of the operation of the circuitry mentioned above with reference to the waveform diagram in FIG. 2. Here, in FIG. 2, the diagram drawn on the upper side denotes a voltage Vds across the drain and the source of the switching element 2 and that on the lower side denotes the voltage Vr of the cathode with reference point to the anode (voltage across both terminals) of the rectifier diode 5. Further, for simplicity of understanding in this case, forward voltage drops of both the rectifier diode 5 and the free-wheeling diode 6 are assumed to be negligible.

During the ON period (Ton) of the switching element 2, the DC input voltage Vi is applied to a primary winding of a transformer so that the voltage Vds across the drain and the source of the switching element 2 becomes zero. Further, the positive voltage is induced at the dotted side terminal of the secondary winding 1B of the transformer 1 so that the rectifier diode 5 comprising the rectifier smoothing circuit 9 turns on while the free-wheeling diode 6 turns off. Accordingly, the voltage Vr across the rectifier diode 5 becomes zero in the same way as the voltage Vds does.

On the other hand, during the OFF period (Toff) of the switching element 2, due to the inertial current flowing through the primary winding 1A of the transformer 1, the reset voltage is generated across the primary winding 1A so that the voltage Vds., which is the sum of the DC input voltage Vi from a DC source 3 and the reset voltage of the primary winding 1A, is applied across the drain and the source of the switching element 2. However, when the voltage Vds across the drain and the source of the switching element 2 reaches the operating voltage Vz of the Zener diode 21, the Zener diode begins to conduct to clamp the voltage Vds. Then, a voltage proportional to a turn ratio of the secondary winding 1B to the primary winding 1A is induced at the non-dotted side terminal of the secondary winding 1B of the transformer 1 so that the rectifier diode 5 turns off, whilst the free-wheeling diode 6 turns on. However, the voltage generated in the secondary winding 1B, that is, the voltage Vr across the rectifier diode 5 is also clamped when the Zener diode 21 begins to conduct. Accordingly, if the ON period of the switching element 2 is prolonged by an abrupt change in an output power or the like, a higher voltage than the operating voltage Vz of the Zener diode 21 is not applied across the switching element 2 and also the voltage Vr across the rectifier diode 5 is clamped at a fixed value by the Zener diode 21.

When the core of the transformer 1 is reset soon, the reset voltage ceases to be generated in the primary winding 1A and the voltage Vds across the drain and the source of the switching element 2 becomes equal to the DC input voltage Vi, while the voltage Vr across the rectifier diode 5 becomes zero. Also in this case, the DC input voltage Vi and a variable range of duty of the switching element 2 or the like are so determined that the product S 1 of the voltage and the time during the OFF period of the switching element 2 is equal to the product S2 of those during the ON period thereof.

According to this embodiment as described above, the Zener diode is coupled across the switching element 2 with reverse polarity to the switching element in the DC/DC converter wherein the series circuit of the primary winding 1A of the transformer 1 and the switching element 2 is coupled to the DC source 3, while the voltage induced in the secondary winding 1B of the transformer 1 by the switching operation of the switching element 2 is rectified and smoothed by the rectifier smoothing circuit 9.

In this case, during the OFF period (Toff) of the switching element 2, the voltage, which is the sum of the DC input voltage Vi of the DC source 3 and the reset voltage generated in the primary winding 1A of the transformer 1, is applied across the switching element 2. However, when the voltage across the switching element 2 (voltage Vds across the drain and the source) reaches the operating voltage Vz of the Zener diode 21, the Zener diode 21 conducts so that the reset voltage ceases increasing further. As a result, if the ON period of the switching element 2 is prolonged by an abrupt change in an output power or the like, the voltage across the switching element 2 is inevitably clamped by the operating voltage Vz of the Zener diode during the OFF period of the switching element 2. Accordingly, notwithstanding such a simple circuitry that only a Zener is added to a conventional one, an increase in the reset voltage of the transformer 1 can be effectively limited during the OFF period of the switching element, so that an element with a superior property and a low withstand voltage can be employed as the switching element 2.

Moreover, as a voltage generated in the secondary winding 1B of the transformer 1 also ceases increasing further when the Zener diode 21 begins to conduct, the voltage Vr, across the rectifier diode 5, of the rectifier smoothing circuit 9, which conducts during the ON period of the switching element 2, is clamped by the conduction of the Zener diode 21 at the fixed value, particularly in the case of a DC/DC forward converter. Accordingly, an element with a lower withstand voltage than that of those used in conventional power converters can be employed as not only the switching element 2 but the rectifier diode 5 serving as the rectifier element 6.

Figure 3:
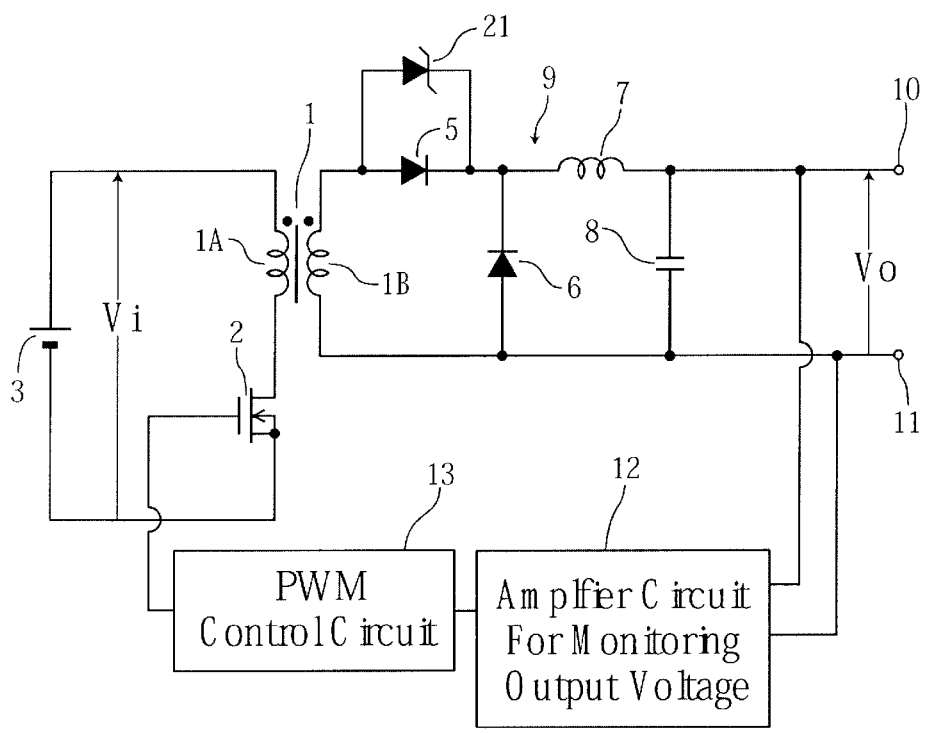
FIG. 3 is a circuit diagram of a DC/DC converter illustrating a second embodiment of the present invention.

Next is a description of a second embodiment of the present invention with reference to the circuit diagram in FIG. 3. In the circuit, a Zener diode 21 with a constant voltage characteristic is coupled across not the switching element 2 but the rectifier diode 5 comprising the rectifier smoothing circuit 9 with the same polarity as the rectifier diode 5. An operating voltage (Zener voltage) Vz of the Zener diode 21 is selected to be lower than a reverse withstand voltage of the rectifier diode 5. The anodes of the Zener diode 21 and of the rectifier diode 5 are mutually coupled and the cathodes of them are done similarly. The other portion of the circuitry is the same as the circuit diagram shown in FIG. 1.

Next is a description of operation of the abovementioned circuitry. The operation during the ON period of the switching element 2 is in common with the above-mentioned prior art and the first embodiment. However, when the switching element 2 turns into the OFF period (Toff), the reset voltage is generated in the primary winding 1A of the transformer 1, and as a result, the voltage Vds, which is the sum of the DC input voltage Vi from the DC source 3 and the reset voltage of the primary winding 1A, is applied across the drain and the source of the switching element 2, while a positive voltage proportional to a turn ratio of the secondary winding 1B to the primary winding 1A is generated at the non-dotted side of terminal of the secondary winding 1B of the transformer 1 so that the rectifier diode 5 turns off and on the contrary the free-wheeling diode 6 turns on. However, when the voltage Vr across the rectifier diode 5 reaches at the operating voltage Vz of the Zener diode 21, the Zener diode 21 conducts so that to clamp the voltage Vr. Further, according to the reset voltage of the transformer 1 being clamped, the voltage Vds across the drain and the source of the switching element 2 ceases increasing further. Accordingly, if the ON period of the switching element 2 is prolonged by an abrupt change of an output power or the like, a higher voltage than the operating voltage Vz of the Zener diode 21 is not applied across the rectifier element 5 and also the voltage Vds across the drain and the source of the switching element 2 is clamped to the fixed value by the Zener diode 21.

When the core of the transformer 1 is reset soon, the reset voltage ceases being generated in the primary winding 1A and the voltage Vds across the drain and the source of the switching element 2 becomes equal to the DC input voltage Vi, while the voltage Vr across the rectifier diode 5 becomes zero. Also in this case, the DC input voltage Vi and a variable range of duty of the switching element 2 or the like are so determined that the product S1 of the voltage and the time during the OFF period of the switching element 2 is equal to the product S2 of those during the ON period of it.

Thus, in the embodiment, the Zener diode 21 is coupled in parallel with the rectifier diode 5 serving as a rectifier element of the rectifier smoothing circuit 9 that conducts during the ON period of the switching element 2 in the DC/DC converter wherein the series circuit of the primary winding 1A of the transformer 1 and the switching element 2 is coupled to the DC source 3 and according to the switching operation of the switching element 2, the voltage induced in the secondary winding 1B of the transformer 1 is rectified and smoothed by the rectifier smoothing circuit 9.

Thus, during the OFF period of the switching element 2, a voltage, which is the sum of the DC input voltage Vi of the DC source 3 and the reset voltage generated in the primary winding 1A of the transformer 1, is applied across the switching element 2, while a voltage proportional to the turn ratio of the secondary winding 1B to the primary winding 1A is induced in the secondary winding 1B of the transformer 1. However, when the voltage Vr across the rectifier element 5 reaches the operating voltage Vz of the Zener diode 21, the Zener diode 21 conducts so that the reset voltage of the transformer 1, that is, the voltage across the switching element 21 ceases increasing further. Consequently, if the ON period of the switching element 2 is prolonged by an abrupt change in an output power or the like, the voltages across the switching element 2 and across the rectifier diode 5 are inevitably clamped during the OFF period of the switching element 2 when the Zener diode 21 begins to conduct. Accordingly, notwithstanding such a simple circuitry that only the Zener diode 21 is added to an conventional circuitry, it becomes possible that an increase in the reset voltage of the transformer 1 can be effectively limited so that an element with a superior property and a low withstand voltage can be employed as the switching element 2 or the rectifier element 5.

Now, the present invention is not limited to the abovementioned embodiments and various modified embodiments are possible. For example, as the switching element, a BJT (Bipolar Junction Transistor) or a IGBT (Insulated Gate Bipolar Transistor) other than the MOSFET used in the embodiments may be employed. Further, the present invention may be applied to, for example, a flyback converter other than a forward converter. Moreover, a circuitry comprising an AC source and a rectifier instead of the DC source 3 may be regarded as the DC source outputting a DC input voltage within a category of the present invention.

What is claimed is:

1. A DC/DC converter including a series circuit of a primary winding of a transformer and a switching element, which is coupled to a DC source and a rectifier smoothing circuit which rectifies and smoothes a voltage induced in a secondary winding of the transformer according to switching operation of the switching element, wherein a Zener diode Is coupled in parallel with a rectifier element of said rectifier smoothing circuit, said rectifier element conducting during an ON period of said switching element.

2. A DC/DC converter according to claim 1, wherein during an OFF period of said switching element, a voltage across said rectifier element is clamped at a fixed value by said Zener diode.

3. A DC/DC converter according to claim 1, wherein when a voltage across said rectifier element reaches a Zener voltage of said Zener diode during an OFF period of said switching element, the Zener diode conducts.

4. A DC/Dc converter according to claim 1, wherein a DC input voltage from said DC source and a variable range of duty of said switching element are so determined that a product of a voltage across said switching element and time during an OFF period of the switching element is equal to a product of a voltage across said switching element and time during an ON period of the switching element.

* * * * *